(12) United States Patent
Kim et al.

(10) Patent No.: US 9,746,712 B2
(45) Date of Patent: Aug. 29, 2017

(54) LIQUID CRYSTAL DISPLAY DEVICE

(71) Applicant: Samsung Display Co., Ltd., Yongin-si, Gyeonggi-Do (KR)

(72) Inventors: Duk-Sung Kim, Asan-si (KR); Yu Jin Lee, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 9 days.

(21) Appl. No.: 14/852,728

(22) Filed: Sep. 14, 2015

(65) Prior Publication Data
US 2016/0282682 A1 Sep. 29, 2016

(30) Foreign Application Priority Data
Mar. 23, 2015 (KR) ........................ 10-2015-0040253

(51) Int. Cl.
*G02F 1/1337* (2006.01)
*G02F 1/1362* (2006.01)
*G02F 1/1343* (2006.01)

(52) U.S. Cl.
CPC .... *G02F 1/133707* (2013.01); *G02F 1/13624* (2013.01); *G02F 1/133753* (2013.01); *G02F 2001/134345* (2013.01)

(58) Field of Classification Search
CPC ...................... G02F 1/134309; G02F 1/136286
See application file for complete search history.

(56) References Cited

U.S. PATENT DOCUMENTS

2015/0177569 A1* 6/2015 Zhang ............... G02F 1/133707
349/42
2016/0170097 A1* 6/2016 Milton ............. B29D 11/00038
349/13

FOREIGN PATENT DOCUMENTS

| KR | 10-0293809 B1 | 4/2001 |
| KR | 10-0486799 B1 | 4/2005 |
| KR | 1020110046125 A | 5/2011 |

* cited by examiner

*Primary Examiner* — Anne Hines
(74) *Attorney, Agent, or Firm* — Cantor Colburn LLP

(57) ABSTRACT

A liquid crystal display includes: a first substrate including a pixel; a pixel electrode in the pixel of the first substrate; a second substrate facing the first substrate; a common electrode on the second substrate; and a liquid crystal layer between the first substrate and the second substrate. The pixel includes a first domain, a second domain, a third domain and a fourth domain. Within the pixel including the first to fourth domains, a planar shape of each of the first domain, the second domain, the third domain and the fourth domain is a right triangle, and among sides of the right triangle, an oblique side of the first domain is adjacent to an oblique side of the second domain, and an oblique side of the third domain is adjacent to an oblique side of the fourth domain.

17 Claims, 11 Drawing Sheets

LIQUID CRYSTAL DISPLAY DEVICE

This application claims priority to Korean Patent Application No. 10-2015-0040253 filed on Mar. 23, 2015, and all the benefits accruing therefrom under 35 U.S.C. §119, the entire contents of which are incorporated herein by reference.

BACKGROUND (a) Field

The invention relates to a liquid crystal display. More particularly, the invention relates to a liquid crystal display for which light transmittance therethrough is improved.

(b) Description of the Related Art

A liquid crystal display, which is one of the most widely used flat panel displays, includes two display panels on which electric field generating electrodes such as a pixel electrode and a common electrode are disposed, and a liquid crystal layer inserted between the two display panels. The liquid crystal display displays an image by generating an electric field in the liquid crystal layer by applying a voltage to the electric field generating electrodes, determining alignments of liquid crystal molecules of the liquid crystal layer through the generated electric field, and controlling polarization of incident light transmitted through the liquid crystal layer.

The two display panels configuring the liquid crystal display may include a thin film transistor array display panel and an opposing display panel. A gate line for transmitting a gate signal and a data line for transmitting a data signal are disposed to cross each other, a thin film transistor connected to the gate line and the data line, a pixel electrode connected to the thin film transistor, and the like may be disposed in the thin film transistor array display panel. A light blocking member, a color filter and a common electrode may be disposed in the opposing display panel. Depending on the type of the liquid crystal display, the light blocking member, the color filter and the common electrode may be disposed in the thin film transistor array display panel instead of the opposing display panel.

Liquid crystal displays have become overall wider, and curved displays are being developed to enhance viewer immersion.

SUMMARY

One or more exemplary embodiments provide a liquid crystal display capable of improving transmittance therethrough.

One or more exemplary embodiments of the invention provide a liquid crystal display including: a first substrate including a pixel; a pixel electrode in the pixel of the first substrate; a second substrate facing the first substrate; a common electrode on the second substrate; and a liquid crystal layer between the first substrate and the second substrate. The pixel includes a first domain, a second domain, a third domain and a fourth domain. Within the pixel including the first domain, the second domain, the third domain and the fourth domain, a planar shape of each of the first domain, the second domain, the third domain and the fourth domain is a right triangle, and among sides of the right triangle, an oblique side of the first domain is adjacent to an oblique side of the second domain, and an oblique side of the third domain is adjacent to an oblique side of the fourth domain.

The pixel electrode in the pixel including the first to fourth domains may include a stem from which a fine branch extends.

Within the pixel including the first to fourth domains, a length of the fine branch in the first domain may be parallel with a length of the fine branch in the second domain, and a length of the fine branch in the third domain may be parallel with a length of the fine branch in the fourth domain.

Within the pixel including the first to fourth domains, the fine branches in the first domain and the second domain may be symmetrical with the fine branches in the third domain and the fourth domain with respect to a border line between the second domain and the third domain as an axis of symmetry.

Within the pixel including the first to fourth domains, a first portion of the stem may be provided on a border line between the first domain and the second domain and a second portion of the stem may be provided on a border line between the third domain and the fourth domain.

Within the pixel including the first to fourth domains, the fine branch in the first domain and the fine branch in the second domain may respectively extend from opposing sides of the first portion of the stem extended along the border line between the first domain and the second domain, and the fine branch in the third domain and the fine branch in the fourth domain may respectively extend from opposing sides of the second portion of the stem extended along the border line between the third domain and the fourth domain.

The liquid crystal display may further include a reference voltage line on the first substrate. The reference voltage line may be at an edge of the pixel including the first to fourth domains.

Within the pixel including the first to fourth domains, the reference voltage line may extend along the border line between the second domain and the third domain.

Within the pixel including the first to fourth domains, a first portion of the reference voltage line may extend along the border line between the first domain and the second domain, and a second portion of the reference voltage line may extend along the border line between the third domain and the fourth domain.

Within the pixel including the first to fourth domains, a first portion of the stem of the pixel electrode may extend along an edge of the pixel, and a second portion of the stem of the pixel electrode may extend along the border line between the second domain and the third domain.

Within the pixel including the first to fourth domains, the pixel electrode may further include a first connection branch extended between the first and second domains, the first connection branch connecting the fine branch in the first domain and the fine branch in the second domain to each other; and a second connection branch extended between the third and fourth domains, the second connection branch connecting the fine branch in the third domain and the fine branch in the fourth domain to each other.

Within the pixel including the first to fourth domains, the first connection branch may be at a center of a border line between the first domain and the second domain, and the second connection branch may be at a center of a border line between the third domain and the fourth domain.

Within the pixel including the first to fourth domains, lengths of the first connection branch and the second connection branch may be parallel with an outer edge of the pixel.

Within the pixel including the first to fourth domains, a length of the first connection branch may be parallel with the fine branch in the first domain and the second domain, and a length of the second connection branch may be parallel with the fine branch in the third domain and the fourth domain.

Within the pixel including the first to fourth domains, the first connection branch may be at an end of a border line between the first domain and the second domain, and the second connection branch may be at an end of a border line between the third domain and the fourth domain.

An overall shape of the pixel including the first to fourth domains may be a quadrangle, and within the quadrangle-shaped pixel including the first to fourth domains a length of a border line between the second domain and the third domain may be parallel with an outer edge of the pixel.

The liquid crystal display may further include a gate line and a data line on the first substrate and crossing each other. Within the pixel including the first to fourth domains, a length of a border line between the second domain and the third domain may be parallel with the gate line.

The liquid crystal display may be curved in a first direction, and within the pixel including the first to fourth domains, a length of a border line between the second domain and the third domain may be parallel with the first direction in which the liquid crystal display is curved.

The pixel including the first to fourth domains further may further include a first subpixel and a second subpixel, and the first subpixel and the second subpixel may each include the first domain, the second domain, the third domain and the fourth domain.

Within the pixel including the first subpixel and the second subpixel, the pixel electrode may include a first sub-pixel electrode in the first subpixel and a second sub-pixel electrode in the second subpixel.

One or more exemplary embodiments of the liquid crystal display according to the invention have the following effects.

One or more exemplary embodiments of the liquid crystal display according to the invention may improve light transmittance therethrough by reducing or effectively preventing generation of a dark spot caused by misalignment between two display panels in a bent state of the liquid crystal display.

Further, one or more exemplary embodiments of the liquid crystal display according to the invention may improve visibility of a user by allowing one pixel to include a plurality of domains.

BRIEF DESCRIPTION OF THE DRAWINGS

The above and other advantages and features of this disclosure will become more apparent by describing in further detail exemplary embodiments thereof with reference to the accompanying drawings, in which.

DETAILED DESCRIPTION

Figure 1:
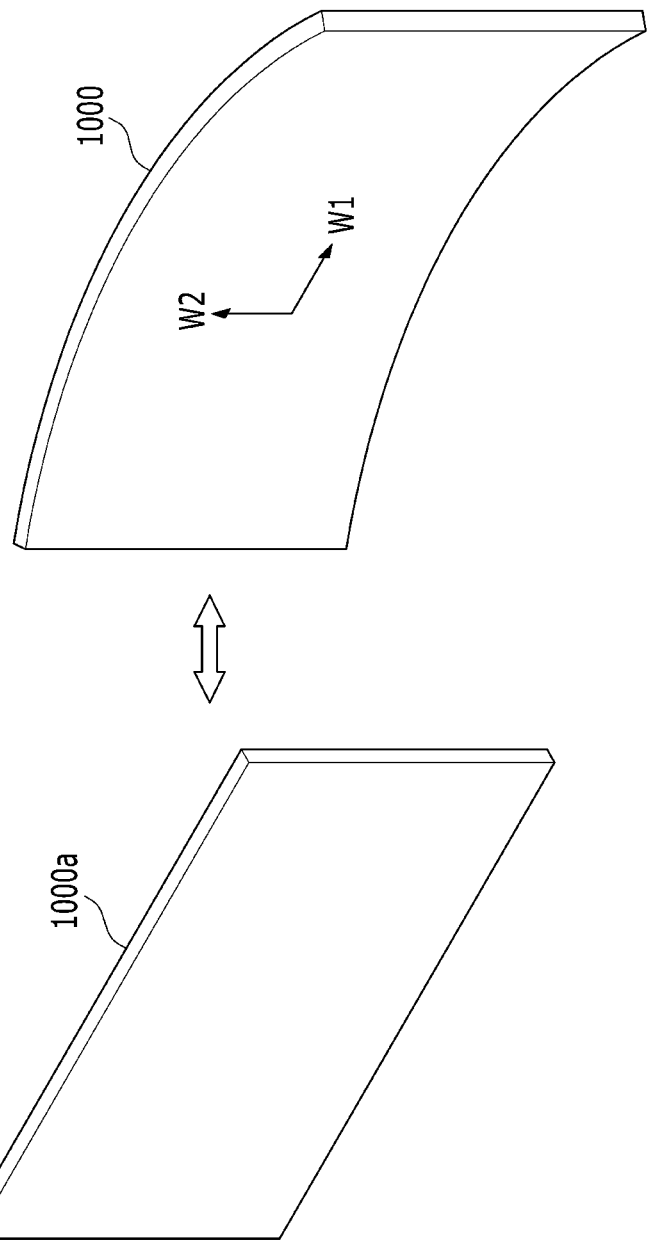
FIG. 1 shows a perspective view of an exemplary embodiment of a liquid crystal display in bent and un-bent states thereof according to the invention.

The invention will be described more fully hereinafter with reference to the accompanying drawings, in which exemplary embodiments of the invention are shown. As those skilled in the art would realize, the described embodiments may be modified in various different ways, all without departing from the spirit or scope of the invention.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A curved liquid crystal display may be realized by disposing components on two display panels, attaching the display panels together to prepare a flat-panel liquid crystal display in a flat (e.g., non-bent) state thereof, and then bending the attached display panels. In bending the attached display panels, the two display panels and components thereof are misaligned, which generates texture and reduces transmittance of the curved liquid crystal display. Therefore, there remains a need for a curved liquid crystal display in which light transmittance therethrough is improved.

An exemplary embodiment of a liquid crystal display according to the invention will now be described with reference to FIG. 1.

FIG. 1 shows a perspective view of an exemplary embodiment of a liquid crystal display in bent and un-bent states thereof according to the invention.

As shown in FIG. 1, the liquid crystal display may be used in the un-bent state thereof for a flat liquid crystal display 1000a or may be used in the bent state thereof for a curved liquid crystal display 1000 having a predetermined curvature in a first direction W1. That is, a same liquid crystal display is usable for both the flat liquid crystal display 1000a and the curved liquid crystal display 1000. The liquid crystal display may be longer in the first direction W1 and shorter in the second direction W2. A thickness direction of the liquid crystal display is taken in a third direction different from the first and second directions W1 and W2, such as being perpendicular to both the first and second directions W1 and W2, but the invention is not limited thereto.

Regarding the exemplary embodiment of the flat liquid crystal display 1000a, the distance from the viewer's eye to a plurality of pixels included in the liquid crystal display varies. In an exemplary embodiment, for example, the distance from a viewer's eye spaced apart from the flat liquid crystal display 1000a at the first direction W1 center of the flat liquid crystal display 1000a to pixels on the left and right edges of the flat liquid crystal display 1000a may be longer than the distance from the viewer's eye to pixels at the center of the flat-panel display device. In contrast, in the exemplary embodiment of the curved liquid crystal display 1000, the distance from the viewer's eye spaced apart from the curved liquid crystal display 1000 at the first direction W1 center of the curved liquid crystal display 1000 to a plurality of pixels at the center, left and right of the curved liquid crystal display 1000 is nearly constant. Since such curved liquid crystal display 1000 provides a relatively wider viewing angle than the flat liquid crystal display 1000a, photoreceptor cells of the viewer are stimulated by more information available at the wider viewing angle, such that more visual information to the viewer's brain via the optic nerve. As such, the sense of reality and immersion of the view can be heightened with the wider viewing angle provided by the curved liquid crystal display 1000.

Exemplary embodiments of a pixel of a liquid crystal display according to the invention will now be described with reference to FIG. 2 to FIG. 7.

Figure 2:
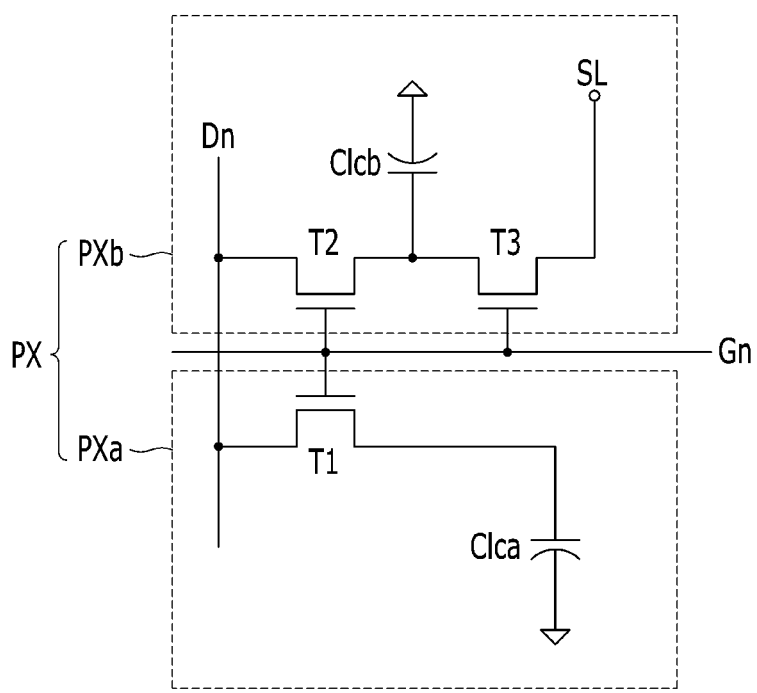
FIG. 2 shows an equivalent circuit diagram of an exemplary embodiment of one pixel of a liquid crystal display according to the invention.
Figure 3:
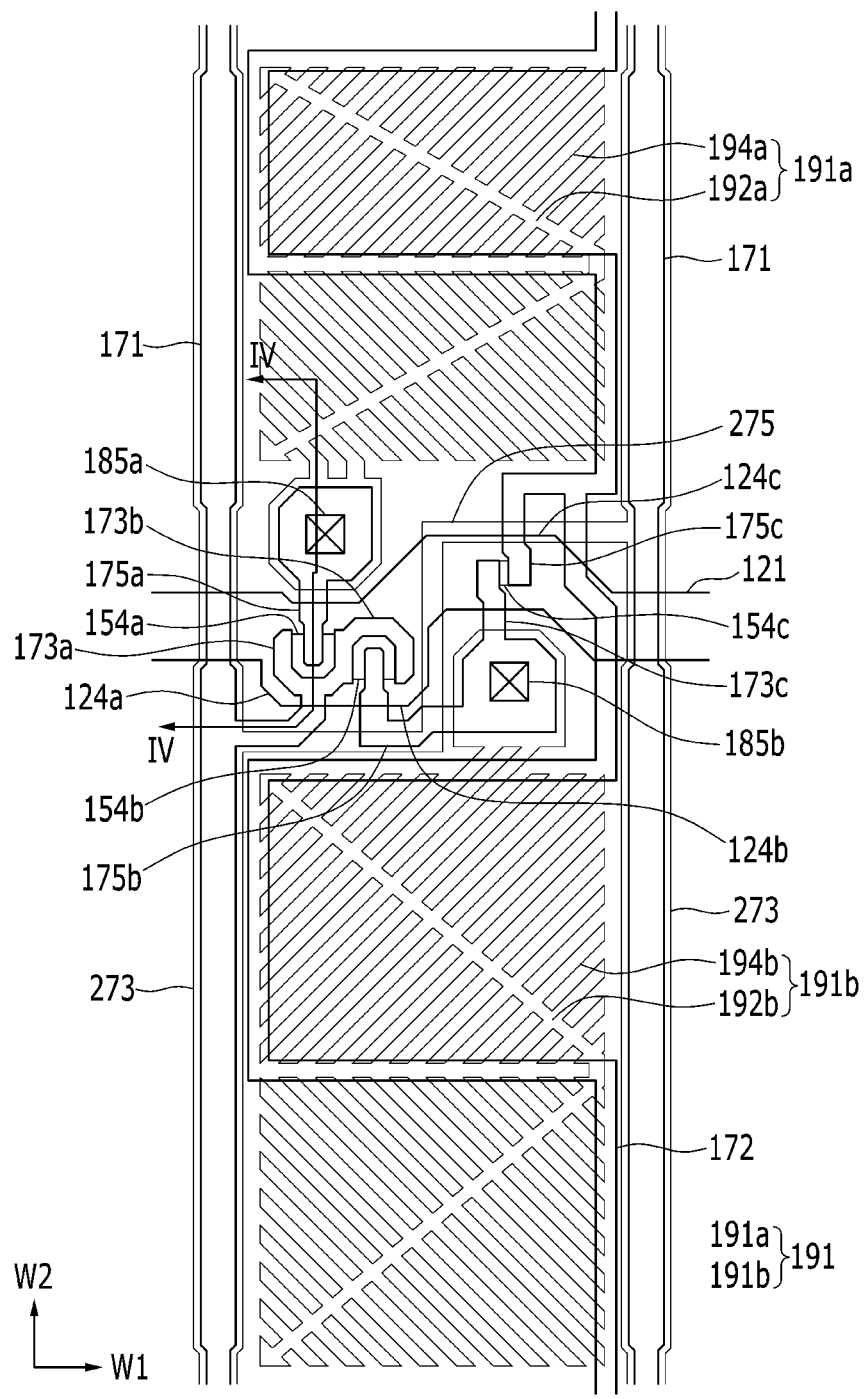
FIG. 3 shows a top plan view of an exemplary embodiment of a liquid crystal display according to the invention.
Figure 4:
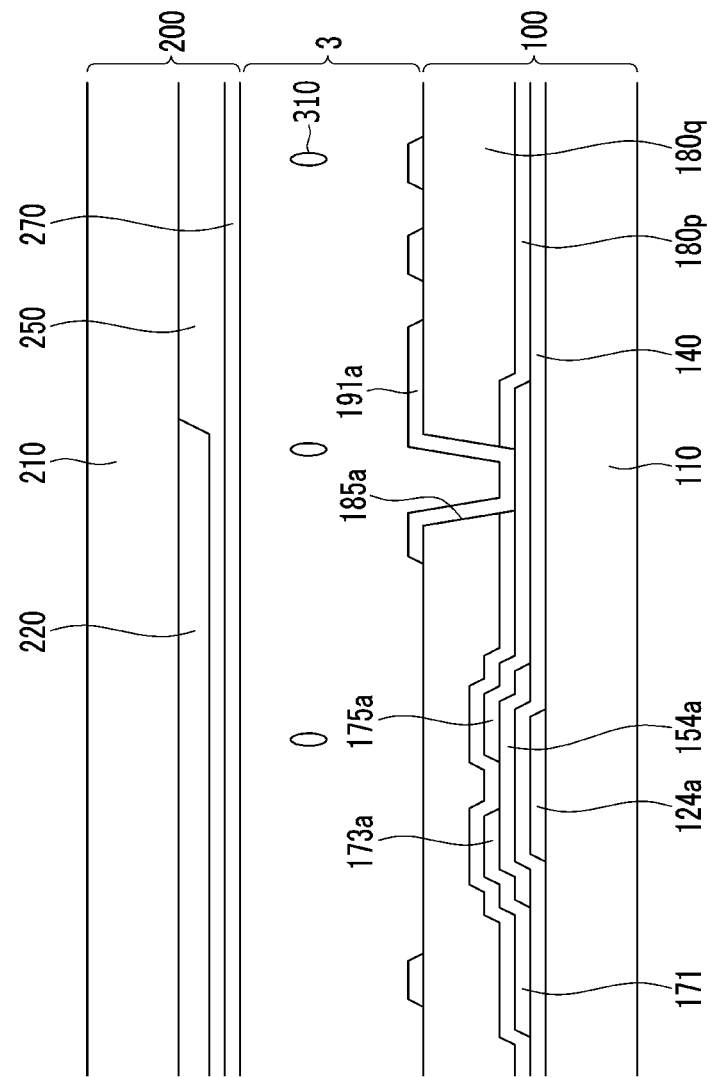
FIG. 4 shows a cross-sectional view of the liquid crystal display of FIG. 3 with respect to line IV-IV.
Figure 5:
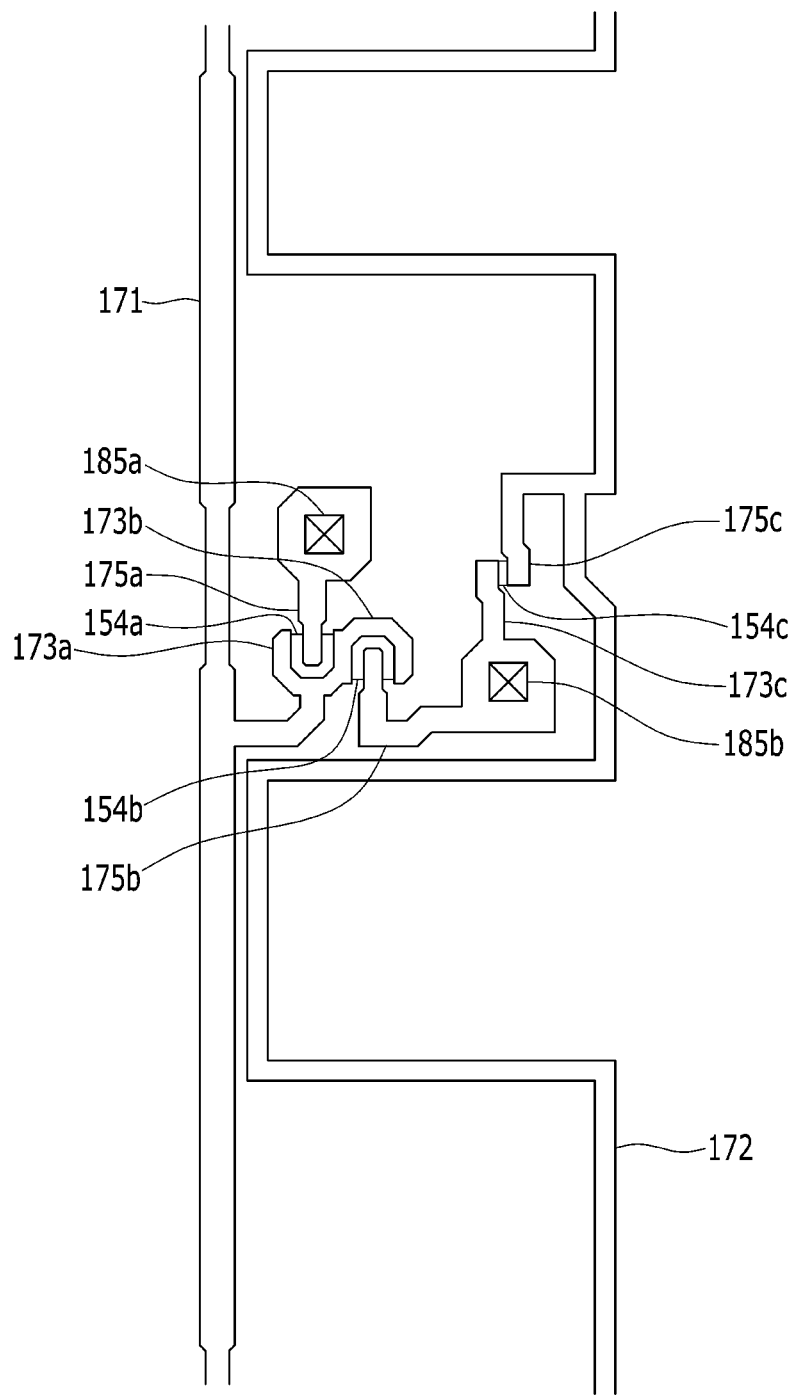
FIG. 5 and FIG. 6 show top plan views of portion of component layers of the liquid crystal display of FIG. 3 according to the invention.
Figure 6:
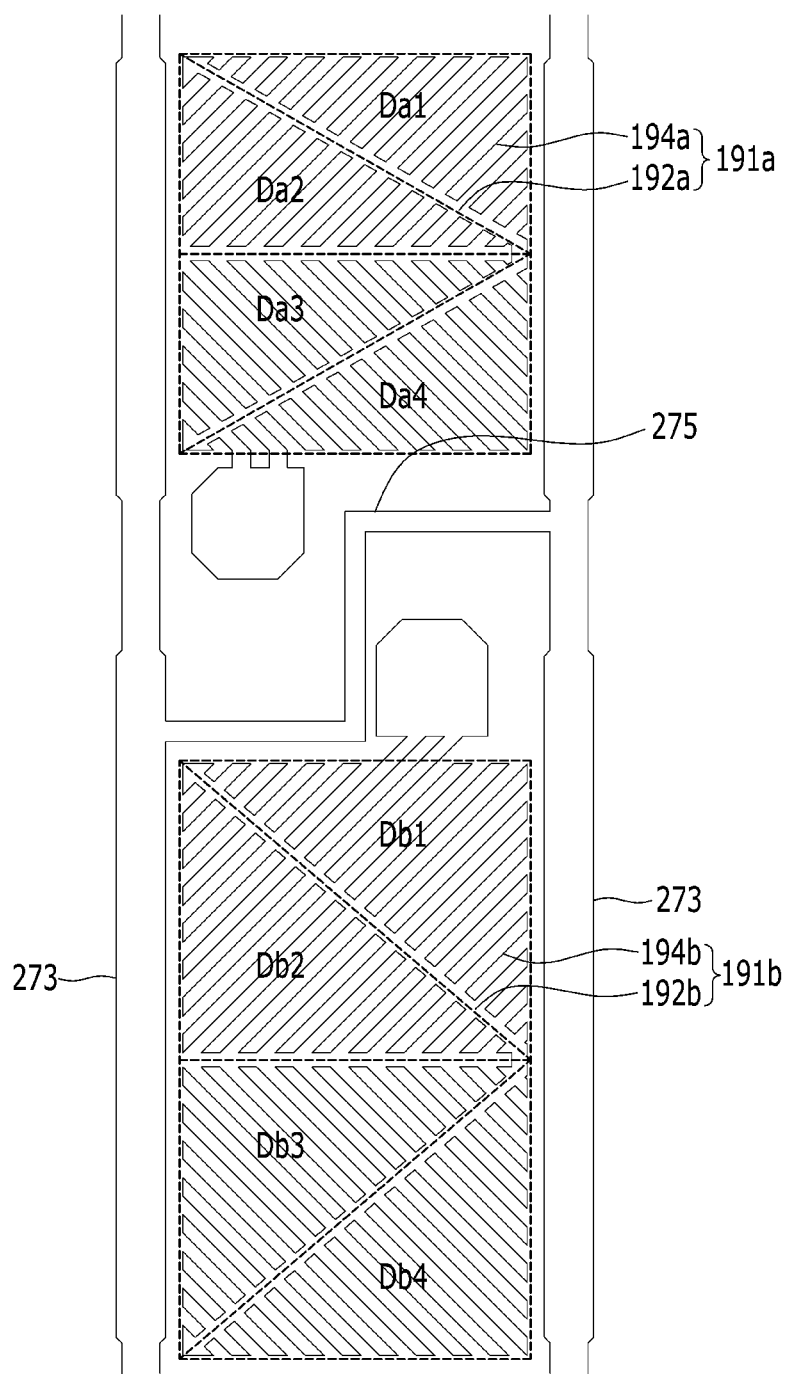
Figure 7:
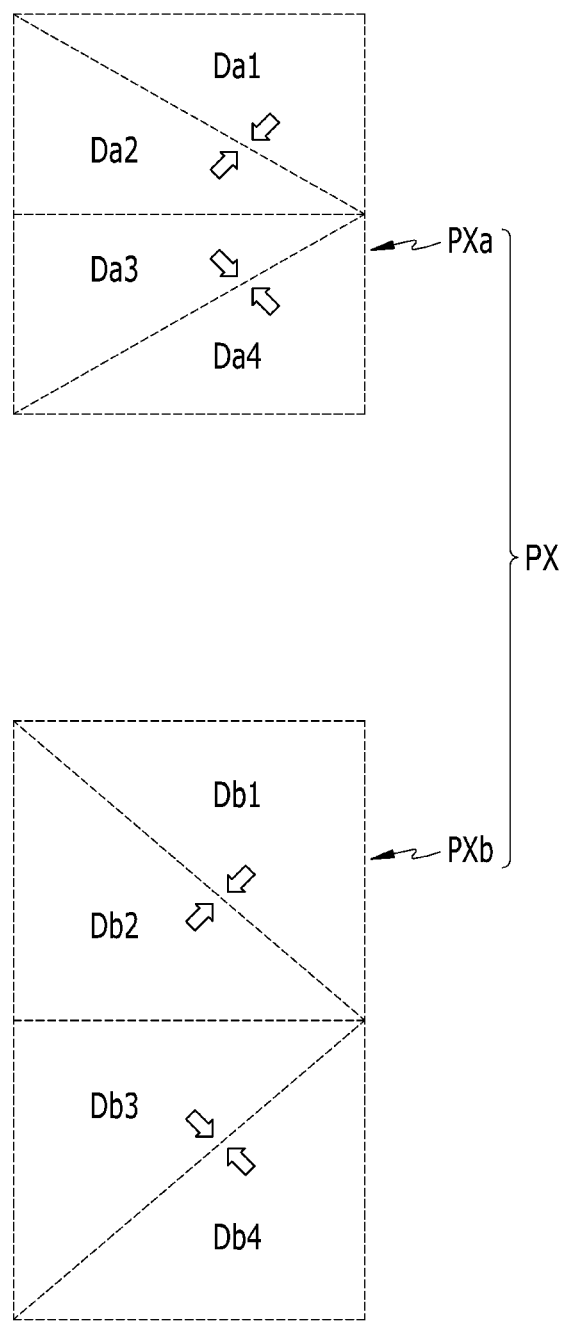
FIG. 7 shows a top plan view of directions in which liquid crystal molecules are inclined in an exemplary embodiment of one pixel of the liquid crystal display of FIG. 3 according to the invention.

FIG. 2 shows an equivalent circuit diagram of an exemplary embodiment of one pixel of a liquid crystal display according to the invention, FIG. 3 shows a top plan view of an exemplary embodiment of a liquid crystal display according to the invention, and FIG. 4 shows a cross-sectional view of the liquid crystal display of FIG. 3 with respect to line IV-IV. FIG. 5 and FIG. 6 show top plan views of component layers of the liquid crystal display of FIG. 3 according to the invention. FIG. 5 shows data lines and constituent elements provided in a same layer. FIG. 6 shows pixel electrodes and constituent elements provided in a same layer. FIG. 7 shows a top plan view of directions in which liquid crystal molecules are inclined in an exemplary embodiment of one pixel of the liquid crystal display of FIG. 3 according to the invention.

Referring to FIG. 2, the liquid crystal display includes a plurality of signal lines Gn, Dn and SL, and a plurality of pixels PX connected thereto.

The signal lines Gn, Dn and SL include a gate line Gn which receives and transmits a gate signal (also called a scan signal), a data line Dn which receives and transmits a data voltage, and a reference voltage line SL which receives and transmits a predetermined voltage.

A first thin film transistor T1 and a second thin film transistor T2 are each connected to the same gate line Gn and the same data line Dn. Further, a third thin film transistor T3 is connected to the same gate line Gn as that of the transistors T1 and T2 and further connected to the second thin film transistor T2 and the reference voltage line SL.

Each pixel PX includes two subpixels PXa and PXb. A first liquid crystal capacitor Clca in the first subpixel PXa is connected to the first thin film transistor T1. Further, a second liquid crystal capacitor Clcb formed in the second subpixel PXb is connected to the second thin film transistor T2.

A first terminal of the first thin film transistor T1 is connected to the gate line Gn, a second terminal thereof is connected to the data line Dn, and a third terminal thereof is connected to the first liquid crystal capacitor Clca. A first terminal of the second thin film transistor T2 is connected to the gate line Gn, a second terminal thereof is connected to the data line Dn, and a third terminal thereof is connected to the second liquid crystal capacitor Clcb. A first terminal of the first thin film transistor T3 is connected to the gate line Gn, a second terminal thereof is connected to the third terminal of the second thin film transistor T2, and a third terminal thereof is connected to the reference voltage line SL.

Regarding operation of the liquid crystal display according to an exemplary embodiment of the invention, when a gate-on voltage is applied to the gate line Gn, the first, second and third thin film transistors T1, T2 and T3 connected thereto are turned on, and the first liquid crystal capacitor Clca and the second liquid crystal capacitor Clcb are charged by the data voltage transmitted through the data line Dn.

Where the first liquid crystal capacitor Clca and the second liquid crystal capacitor Clcb are charged by the data voltage transmitted through the data line Dn, the third thin film transistor T3 is turned on and portion of the voltage charged in the second liquid crystal capacitor Clcb is output to the reference voltage line SL. Accordingly, even though the data voltages that are transmitted to the first subpixel PXa and the second subpixel PXb through the data line Dn are equal to each other, the voltages that are charged in the first liquid crystal capacitor Clca and the second liquid crystal capacitor Clcb are different from each other. That is, the voltage that is charged in the second liquid crystal capacitor Clcb is lower than the voltage that is charged in the first liquid crystal capacitor Clca. Accordingly, it is possible to improve side visibility of the liquid crystal display by charging different subpixels PXa and PXb in the same pixel PX with different voltages.

Referring to FIG. 3 to FIG. 7, the liquid crystal display includes a lower panel 100 and an upper panel 200 facing each other in the thickness direction, and a liquid crystal layer 3 provided between the display panels 100 and 200.

The lower panel 100 will now be described.

A gate metal layer including a gate line 121, a first gate electrode 124a, a second gate electrode 124b and a third gate electrode 124c is disposed on a first substrate 110 made of or including transparent glass or plastic.

The first substrate 110 may be made of or include a bendable (e.g., flexible) material.

The gate line 121 is elongated to mainly extend in a horizontal direction in the top plan view of FIG. 3, and transmits a gate signal. The first gate electrode 124a and the second gate electrode 124b protrude from the gate line 121 and are connected to each other to form a unitary gate electrode element. The first gate electrode 124a and the second gate electrode 124b are shown to protrude vertically downward from the gate line 121 on the top plan view, but the invention is not limited thereto. In an alternative exemplary embodiment, the first gate electrode 124a and the second gate electrode 124b may protrude vertically upward from the gate line 121 or may be provided on the gate line 121.

The first gate electrode 124a, the second gate electrode 124b and the third gate electrode 124c are connected to the same gate line 121 and receive a same gate signal.

Although not shown, a storage electrode may be further disposed on the first substrate 110. The storage electrode may be provided at an edge of the two subpixels PXa and PXb, and may be disposed in and/or on a same layer as the gate line 121 among layers of the lower panel 100 disposed on the first substrate 110. A constant voltage such as a common voltage is applied to the storage electrode.

A gate insulating layer 140 is disposed on the gate line 121, the first gate electrode 124a, the second gate electrode 124b and the third gate electrode 124c. The gate insulating layer 140 may be formed with or include an inorganic insulating material such as a silicon nitride (SiNx) or a silicon oxide (SiOx). The gate insulating layer 140 may also have a single layer or a multilayer structure.

A first semiconductor 154a, a second semiconductor 154b and a third semiconductor 154c are disposed on the gate insulating layer 140. The first semiconductor 154a may be provided on (e.g., overlapping) the first gate electrode 124a, the second semiconductor 154b may be provided on the second gate electrode 124b and the third semiconductor 154c may be provided on the third gate electrode 124c. The first semiconductor 154a, the second semiconductor 154b and the third semiconductor 154c may be formed of or include amorphous silicon, polycrystalline silicon, or a metal oxide.

Although not shown, a first ohmic contact may be disposed on (e.g., overlapping) the first semiconductor 154a, a second ohmic contact may be disposed on the second semiconductor 154b and a third ohmic contact may be disposed on the third semiconductor 154c. The first ohmic contact, the second ohmic contact and the third ohmic contact may be made of or include a material such as a silicide or an n+ hydrogenated amorphous silicon with an n-type impurity doped at a relatively high concentration.

A data metal layer, which includes a reference voltage line 172, a data line 171, a first source electrode 173a, a first drain electrode 175a, a second source electrode 173b, a second drain electrode 175b, a third source electrode 173c and a third drain electrode 175c, is disposed on the first semiconductor 154a, the second semiconductor 154b, the third semiconductor 154c and gate insulating layer 140.

In an exemplary embodiment of manufacturing a liquid crystal display, the first semiconductor 154a, the second semiconductor 154b and the third semiconductor 154c may be formed by a same process as that which forms the data line 171. Referring to FIG. 4, for example, the first semiconductor 154a is provided below the data line 171 with respect to a thickness (e.g., cross-sectional) direction. Other semiconductors may be similarly provided below the data metal layer elements with respect to the cross-sectional direction.

The reference voltage line 172 receives and transmits a predetermined voltage, is elongated to extend mainly in a vertical direction to have portions thereof extending in a horizontal direction perpendicular to the vertical direction, and crosses the gate line 121. The reference voltage line 172 is provided in the subpixels PXa and PXb and at edges thereof. Referring to FIG. 5, portions of the reference voltage line 172 extend in the horizontal direction at an upper edge and a center of the first subpixel PXa and extend in the vertical direction at a left edge and a right edge of the first subpixel PXa. Portions of the reference voltage line 172 extend in the horizontal direction at an upper edge and a center of the second subpixel PXb, and extend in the vertical direction at a left edge and a right edge of the second subpixel PXb.

A predetermined voltage may be applied to the reference voltage line 172. A same voltage as the voltage applied to the storage electrode or a different voltage than that applied to the storage electrode may be applied to the reference voltage line 172. In an exemplary embodiment, for example, the difference between the voltage applied to the reference voltage line 172 and the voltage applied to the storage electrode may be about 3 volts.

The data line 171 receives and transmits the data signal, is elongated to extend mainly in the vertical direction, and crosses the gate line 121. The data line 171 is disposed in a same layer as the reference voltage line 172 among layers of the lower panel 100 disposed on the first substrate 110.

The first source electrode 173a protrudes from the data line 171 to be disposed over the first gate electrode 124a. In the top plan view, the first source electrode 173a may be bent to have a 'C' shape at the first gate electrode 124a.

The first drain electrode 175a is disposed at the first gate electrode 124a to be separated from the first source electrode 173a. The first drain electrode 175a includes a relatively wide first end portion and a bar-type second end portion opposite to the first end portion. The bar-type second end portion of the first drain electrode 175a is partly surrounded by the first source electrode 173a in the top plan view. A channel of a thin film transistor is formed by the underlying first semiconductor 154a exposed between the first source electrode 173a and the first drain electrode 175a which are separated from each other.

The second source electrode 173b extends from the first source electrode 173a and is provided on the second gate electrode 124b. The second source electrode 173b may be bent to have a 'C' shape.

The second drain electrode 175b is disposed at the second gate electrode 124b to be separated from the second source electrode 173b. The second drain electrode 175b includes a relatively wide first end portion and a bar-type second end portion opposite to the first end portion. The bar-type second end portion of the second drain electrode 175b is partly surrounded by the second source electrode 173b in the top plan view. A channel of a thin film transistor is formed by the underlying second semiconductor 154b exposed between the second source electrode 173b and the second drain electrode 175b which are separated from each other.

The third source electrode 173c is connected to the second drain electrode 175b, particularly to the relatively wide second end portion of the second drain electrode 175b, to form a unitary electrode member. The third source electrode 173c is provided on the third gate electrode 124c. An overall shape of the third source electrode 173c is a bar-type shape.

The third drain electrode 175c is separated from the third source electrode 173c at the third gate electrode 124c. A channel of a thin film transistor is formed by the underlying third semiconductor 154c exposed between the third source electrode 173c and the third drain electrode 175c which are separated from each other.

The above-described first gate electrode 124a, the first semiconductor 154a, the first source electrode 173a and the first drain electrode 175a form a first thin film transistor. The second gate electrode 124b, the second semiconductor 154b, the second source electrode 173b and the second drain electrode 175b form a second thin film transistor. The third gate electrode 124c, the third semiconductor 154c, the third source electrode 173c and the third drain electrode 175c form a third thin film transistor.

A first passivation layer 180p is disposed on the data line 171, the first, second and third source electrodes 173a, 173b and 173c, and the first, second and third drain electrodes 175a, 175b and 175c. The first passivation layer 180p may be formed with or include an inorganic insulating material such as a silicon nitride (SiNx) or a silicon oxide (SiOx).

A second passivation layer 180q may be disposed on the first passivation layer 180p. The second passivation layer 180q may be formed with or include a color filter material to be a color filter of the liquid crystal display. The color filter may express one of the primary colors such as red, green and blue. The primary colors are exemplarily red, green and blue, or yellow, cyan and magenta. The color filter may be further configured with a color filter portion which expresses a mixed color of the primary colors or which expresses a white color. The second passivation layer 180q may be formed with or include a transparent organic film rather than the color filter material. In an exemplary embodiment, the second passivation layer 180q may be omitted depending on the type of the liquid crystal display. In another exemplary embodiment, the color filter may be disposed in the upper panel 200 rather than in the lower panel 100.

A first contact hole 185a and a second contact hole 185b which expose the first drain electrode 175a and the second drain electrode 175b are defined in the first passivation layer 180p and the second passivation layer 180q. The first contact hole 185a exposes the relatively wide first end portion of the first drain electrode 175a, and the second contact hole 185b exposes the relatively wide first end portion of the second drain electrode 175b.

A pixel electrode 191 is disposed on the second passivation layer 180q. The pixel electrode 191 may be formed with or include a transparent metal oxide such as indium-tin oxide ("ITO") or indium-zinc oxide ("IZO").

The pixel electrode 191 includes a first sub-pixel electrode 191a and a second sub-pixel electrode 191b. The first sub-pixel electrode 191a is disposed in the first subpixel PXa, and the second sub-pixel electrode 191b is disposed in the second subpixel PXb.

The first sub-pixel electrode 191a is connected to the first drain electrode 175a through the first contact hole 185a, and the second sub-pixel electrode 191b is connected to the second drain electrode 175b through the second contact hole 185b. Therefore, the first sub-pixel electrode 191a and the second sub-pixel electrode 191b receive the data voltage from the first drain electrode 175a and the second drain electrode 175b, respectively. A portion of the data voltage applied to the second drain electrode 175b is divided by the third source electrode 173c, and the voltage applied to the second sub-pixel electrode 191b becomes less than the voltage applied to the first sub-pixel electrode 191a. That is, the first data voltage applied to the first sub-pixel electrode 191a is greater than the second data voltage applied to the second sub-pixel electrode 191b. This above description corresponds to a positive (+) data voltage applied to the first sub-pixel electrode 191a and the second sub-pixel electrode 191b. In contrast, when a negative (−) data voltage is applied to the first sub-pixel electrode 191a and the second sub-pixel electrode 191b, the voltage applied to the first sub-pixel electrode 191a becomes less than the voltage applied to the second sub-pixel electrode 191b.

In the top plan view, an overall planar area of the second sub-pixel electrode 191b may be about one to two times greater than an overall planar area of the first sub-pixel electrode 191a. The first sub-pixel electrode 191a may neighbor the second sub-pixel electrode 191*b* in the vertical direction with a gate line 121 therebetween.

An overall shape of the first sub-pixel electrode 191*a* is a quadrangle. The first sub-pixel electrode 191*a* includes a first stem 192*a*, and a first fine branch 194*a* extending from the first stem 192*a*. The first stem 192*a* includes portions which extend in two different oblique directions with respect to the gate line 121, and these portions are connected to each other to form a unitary first sub-pixel electrode 191*a*. Portions of the first stem 192*a* extend in a top left direction and a bottom left direction from the center of the right edge of the first subpixel PXa. The invention is not limited thereto, and portions of the first stem 192*a* may extend in a top right direction and a bottom right direction from the center at the left edge of the first subpixel PXa. The first fine branch 194*a* extends to respective opposing sides from the oblique-extending portions of the first stem 192*a*.

An overall shape of the second sub-pixel electrode 191*b* is a quadrangle. The second sub-pixel electrode 191*b* includes a second stem 192*b*, and a second fine branch 194*b* extending from the second stem 192*b*. The second stem 192*b* includes portions which extend in two different oblique directions with respect to the gate line 121, and these portions are connected to each other to form a unitary second sub-pixel electrode 191. The portions of the second stem 192*b* extend in a top left direction and a bottom left direction from the center of the right edge of the second subpixel PXb. The invention is not limited thereto, and portions of the second stem 192*b* may extend in a top right direction and a bottom right direction from the center at the left edge of the second subpixel PXb. The second fine branch 194*b* extends to respective opposite sides from the oblique-extending portions of the second stem 192*b*.

The first subpixel PXa and the second subpixel PXb are each divided into four regions Da1, Da2, Da3 and Da4, and Db1, Db2, Db3 and Db4, respectively. The first to fourth regions Da1, Da2, Da3 and Da4 are sequentially arranged in the second direction W2. Similarly, the first to fourth regions Db1, Db2, Db3 and Db4 are sequentially arranged in the second direction W2. The regions Da1, Da2, Da3, Da4, Db1, Db2, Db3 and Db4 of the subpixels PXa and PXb are configured by first domains Da1 and Db1, second domains Da2 and Db2, third domains Da3 and Db3, and fourth domains Da4 and Db4. The above-described exemplary embodiment represents one pixel PX including two subpixels PXa and PXb, but the invention is not limited thereto. In an exemplary embodiment, for example, when one pixel does not include a plurality of subpixels, each pixel may include first to fourth domains. When one pixel includes three subpixels, each of the three subpixels may include first to fourth domains.

The first domain Da1, the second domain Da2, the third domain Da3 and the fourth domain Da4 of the first subpixel PXa are similar in planar size. The first domain Db1, the second domain Db2, the third domain Db3 and the fourth domain Db4 of the second subpixel PXb are similar in planar size.

An overall shape of each of the first domains Da1 and Db1, the second domains Da2 and Db2, the third domains Da3 and Db3, and the fourth domains Da4 and Db4 may be substantially right triangles. The right triangles of the domains may be nested in the second direction W2. Oblique sides of the domains are the hypotenuse of the right triangles. Oblique sides of the first domains Da1 and Db1 may be provided adjacent to and facing oblique sides of the second domains Da2 and Db2, and oblique sides of the third domains Da3 and Db3 may be provided adjacent to and facing oblique sides of the fourth domains Da4 and Db4. First-side sides of the second domains Da2 and Db2 may be provided adjacent to first-side sides of the third domains Da3 and Db3.

The fine branches 194*a* and 194*b* provided in the first domains Da1 and Db1 are parallel with the fine branches 194*a* and 194*b* provided in the second domains Da2 and Db2. That is, lengths of the fine branches 194*a* and 194*b* provided in the first domains Da1 and Db1 are parallel with lengths of the fine branches 194*a* and 194*b* provided in the second domains Da2 and Db2. An angle between the fine branches 194*a* and 194*b* provided in the first domains Da1 and Db1 and the gate line 121 substantially corresponds to an angle between the fine branches 194*a* and 194*b* provided in the second domains Da2 and Db2 and the gate line 121.

The fine branches 194*a* and 194*b* provided in the third domains Da3 and Db3 are parallel with the fine branches 194*a* and 194*b* provided in the fourth domains Da4 and Db4. That is, lengths of the fine branches 194*a* and 194*b* provided in the third domains Da3 and Db3 are parallel with lengths of the fine branches 194*a* and 194*b* provided in the fourth domains Da4 and Db4. An angle between the fine branches 194*a* and 194*b* provided in the third domains Da3 and Db3 and the gate line 121 substantially corresponds to an angle between the fine branches 194*a* and 194*b* provided in the fourth domains Da4 and Db4 and the gate line 121.

The fine branches 194*a* and 194*b* provided in the first domains Da1 and Db1 and the second domains Da2 and Db2 are symmetric with the fine branches 194*a* and 194*b* provided in the third domains Da3 and Db3 and the fourth domains Da4 and Db4 with respect to a border line between the second domains Da2 and Db2 and the third domains Da3 and Db3 as an axis of symmetry.

The border between the second domains Da2 and Db2 and the third domains Da3 and Db3 is parallel with the first direction W1 that is a curvature direction of a curved liquid crystal display. That is, a length of the border between the second domains Da2 and Db2 and the third domains Da3 and Db3 is parallel with the first direction W1. The border between the second domains Da2 and Db2 and the third domains Da3 and Db3 is provided at the centers of the subpixels PXa and PXb, respectively. The reference voltage line 172 may be provided on the border between the second domains Da2 and Db2 and the third domains Da3 and Db3.

The stems 192*a* and 192*b* are provided on the border between the first domains Da1 and Db1 and the second domains Da2 and Db2, and are provided on the border between the third domains Da3 and Db3 and the fourth domains Da4 and Db4.

A shield electrode 273 may be disposed on the second passivation layer 180*q*. The shield electrode 273 may be in a same layer as the pixel electrode 191 among layers of the lower panel 100 disposed on the first substrate 110. The shield electrode 273 may overlap the data line 171. A constant voltage such as a common voltage may be applied to the shield electrode 273.

A connecting electrode 275 for connecting neighboring shield electrodes 273 may be further disposed and may be formed in a same layer as the pixel electrode 191 among layers of the lower panel 100 disposed on the first substrate 110.

The upper panel 200 will now be described. A light blocking member 220 is disposed on a second substrate 210 made of or including transparent glass or plastic.

The second substrate 210 is made of or includes a bendable (e.g., flexible) material.

The light blocking member 220 is also called a black matrix, and is configured to prevent light leakage. The light blocking member 220 may overlap the gate line 121, the data line 171, and the first, second and third thin film transistors. Referring to FIG. 4, the light blocking member 220 is disposed in the upper panel 200, but the invention is not limited thereto. In an exemplary embodiment, the light blocking member 220 may be disposed in the lower panel 100.

An overcoat 250 may be disposed on the light blocking member 220, and a common electrode 270 may be disposed on the overcoat 250.

The liquid crystal layer 3 includes liquid crystal molecules 310 having negative dielectric anisotropy, and the liquid crystal molecules 310 may be aligned so that long axes thereof are substantially perpendicular with respect to the surfaces of the two display panels 100 and 200 in a state in which there is no electric field.

The first subpixel electrode 191a and the second subpixel electrode 191b to which the data voltage is applied generate an electric field along with the common electrode 270 of the upper display panel 200, thereby determining alignment of liquid crystal molecules 310 of the liquid crystal layer 3 between the two electrodes 191 and 270. The electric field includes a perpendicular component that is substantially perpendicular to surfaces of the lower panel 100 and the upper panel 200, and the liquid crystal molecules 310 tend to be inclined to be parallel with the surfaces of the lower panel 100 and the upper panel 200 due to the perpendicular component of the electric field. The luminance of light passing through the liquid crystal layer 3 along the alignment direction of the liquid crystal molecules 310 determined as described above is thereby changed.

A fringe field is formed between the edges of the stems 192a and 192b and the fine branches 194a and 194b of the pixel electrode 191 and the common electrode 270 so the liquid crystal molecules 310 are inclined substantially toward the stems 192a and 192b and parallel with the fine branches 194a and 194b. In FIG. 7, incline directions of the liquid crystal molecules 310 are indicated with arrows.

Referring to the top plan view of FIG. 7, the liquid crystal molecules 310 are inclined in a direction toward the bottom left in the first domains Da1 and Db1. The liquid crystal molecules 310 are inclined in a direction toward the top right in the second domains Da2 and Db2. The liquid crystal molecules 310 are inclined in a direction toward the bottom right in the third domains Da3 and Db3. The liquid crystal molecules 310 are inclined in a direction toward the top left in the fourth domains Da4 and Db4.

One or more of the liquid crystal display according to the invention is usable both in a flat state thereof for the flat liquid crystal display and in a non-flat state thereof for the curved liquid crystal display, where in the non-flat state the liquid crystal display is bent in the third direction along the first direction W1 for the curved liquid crystal display. Accordingly, in the non-flat (e.g., the bent) state of the liquid crystal display, the first substrate 110 is misaligned with the second substrate 210.

As described above, in the exemplary embodiment of the liquid crystal display according to the invention, the fine branches 194a and 194b provided in the first domains Da1 and Db1 are parallel with the fine branches 194a and 194b provided in the second domains Da2 and Db2. That is, the fine branches 194a and 194b are parallel in the first domains Da1 and Db1 and the second domains Da2 and Db2 which are respectively adjacent to each other along the first direction W1. Therefore, under influence of the fine branches 194a and 194b in the first domains Da1 and Db1 respectively adjacent to the second domains Da2 and Db2, the incline direction of the liquid crystal molecules 310 provided in the first domains Da1 and Db1 is parallel to the incline direction of the liquid crystal molecules 310 provided in the second domains Da2 and Db2.

As described above, in the exemplary embodiment or the liquid crystal display according to the invention, the fine branches 194a and 194b provided in the third domains Da3 and Db3 are parallel with the fine branches 194a and 194b provided in the fourth domains Da4 and Db4. That is, the fine branches 194a and 194b are parallel in the third domains Da3 and Db3 and the fourth domains Da4 and Db4 which are respectively adjacent to each other along the first direction W1. Therefore, under influence of the fine branches 194a and 194b in the third domains Da3 and Db3 respectively adjacent to the fourth domains Da4 and Db4, the incline direction of the liquid crystal molecules 310 provided in the third domains Da3 and Db3 is parallel to the incline direction of the liquid crystal molecules 310 provided in the fourth domains Da4 and Db4.

In a conventional liquid crystal display, when the first substrate 110 is misaligned from the second substrate 210 and the incline direction of the liquid crystal molecules 310 provided near the first substrate 110 becomes different from the incline direction of the liquid crystal molecules 310 provided near the second substrate 210, a dark spot may be seen and texture occurs.

In one or more exemplary embodiment of the liquid crystal display according to the invention, when the liquid crystal display is bent in the third direction along the first direction W1 for the curved liquid crystal display, the incline directions of the liquid crystal molecules 310 provided in the first domains Da1 and Db1 and in the second domains Da2 and Db2 respectively adjacent to each other in the first direction W1 (e.g., curvature direction of the liquid crystal display) are parallel to each other to reduce or effectively prevent generation of texture because of the misalignment between the first substrate 110 and the second substrate 210. Furthermore, the incline directions of the liquid crystal molecules 310 provided in the third domains Da3 and Db3 and in the fourth domains Da4 and Db4 respectively adjacent to each other in the first direction W1 are parallel, thereby further reducing or effectively preventing the generation of texture because of the misalignment between the first substrate 110 and the second substrate 210.

Another exemplary embodiment of a liquid crystal display according to the invention will now be described with reference to FIG. 8.

Figure 8:
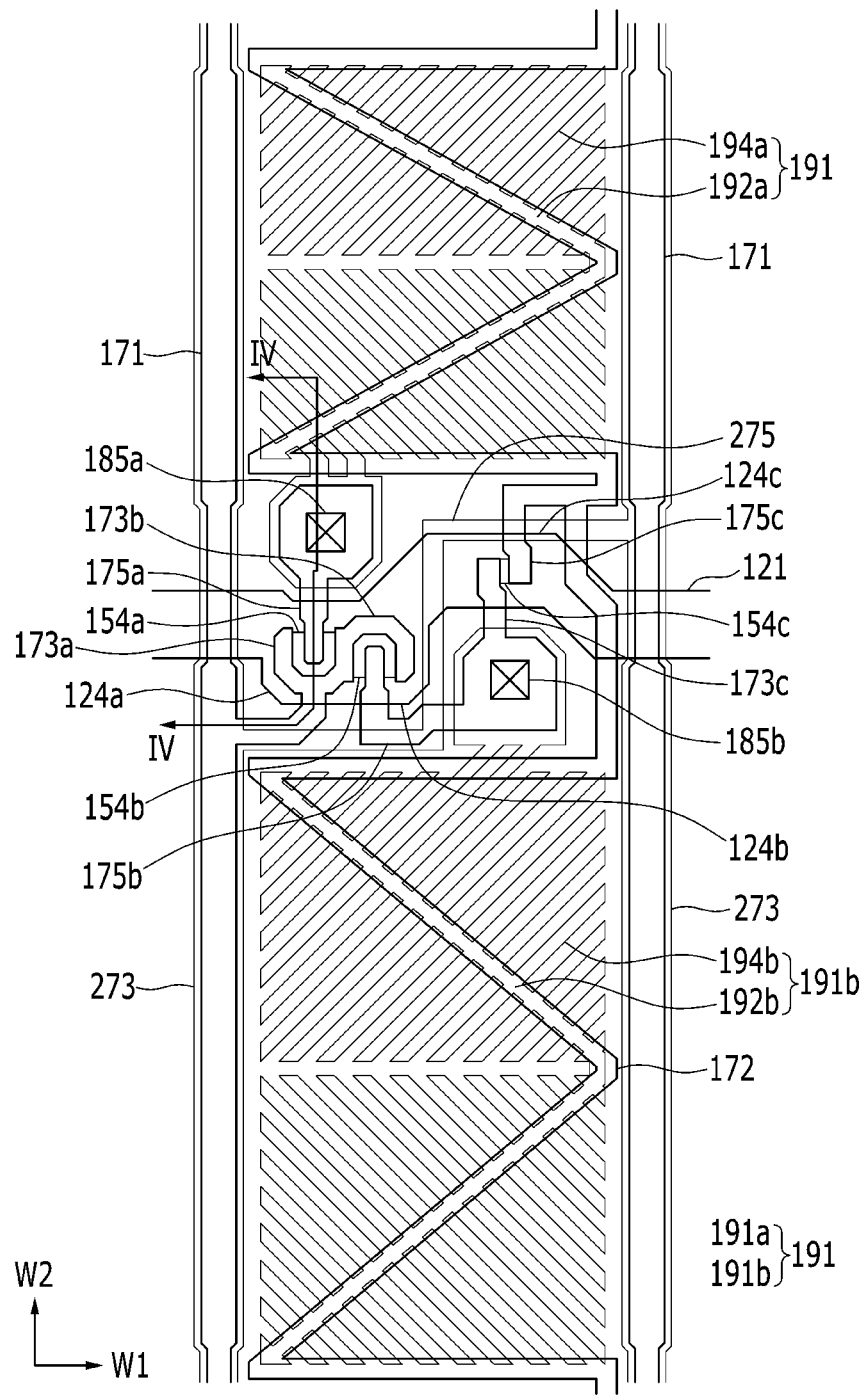
FIG. 8 shows a top plan view of another exemplary embodiment of a liquid crystal display according to the invention.

The liquid crystal display according to the invention shown in FIG. 8 substantially corresponds to the liquid crystal display according to the invention shown in FIG. 1 to FIG. 7, thus no duplicate descriptions will be provided. In the exemplary embodiment of the liquid crystal display in FIG. 8, a formation position of the reference voltage line is different from the previous exemplary embodiment, which will now be described.

FIG. 8 shows a top plan view of another exemplary embodiment of a liquid crystal display according to the invention.

Similar to the previous exemplary embodiment, a gate line 121, a data line 171, a reference voltage line 172 and a pixel electrode 191 are disposed on a first substrate 110.

The reference voltage line 172 transmits a predetermined voltage, and is elongated to mainly extend in a vertical direction to have portions thereof extending in a horizontal direction perpendicular to the vertical direction and in a diagonal direction inclined with respect to both the vertical and horizontal directions. The reference voltage line 172 is provided in the subpixels PXa and PXb and at edges thereof. Horizontal portions of the reference voltage line 172 are provided at upper edges and lower edges of the first subpixel PXa and the second subpixel PXb. Inclined portions of the reference voltage line 172 are respectively provided at the border between the first domains Da1 and Db1 and the second domains Da2 and Db2, and are respectively provided at the border between the third domains Da3 and Db3 and the fourth domains Da4 and Db4. The inclined portions of the reference voltage line 172 overlaps stems 192a and 192b of the pixel electrode 191.

A liquid crystal display according to still another exemplary embodiment of the invention will now be described with reference to FIG. 9.

Figure 9:
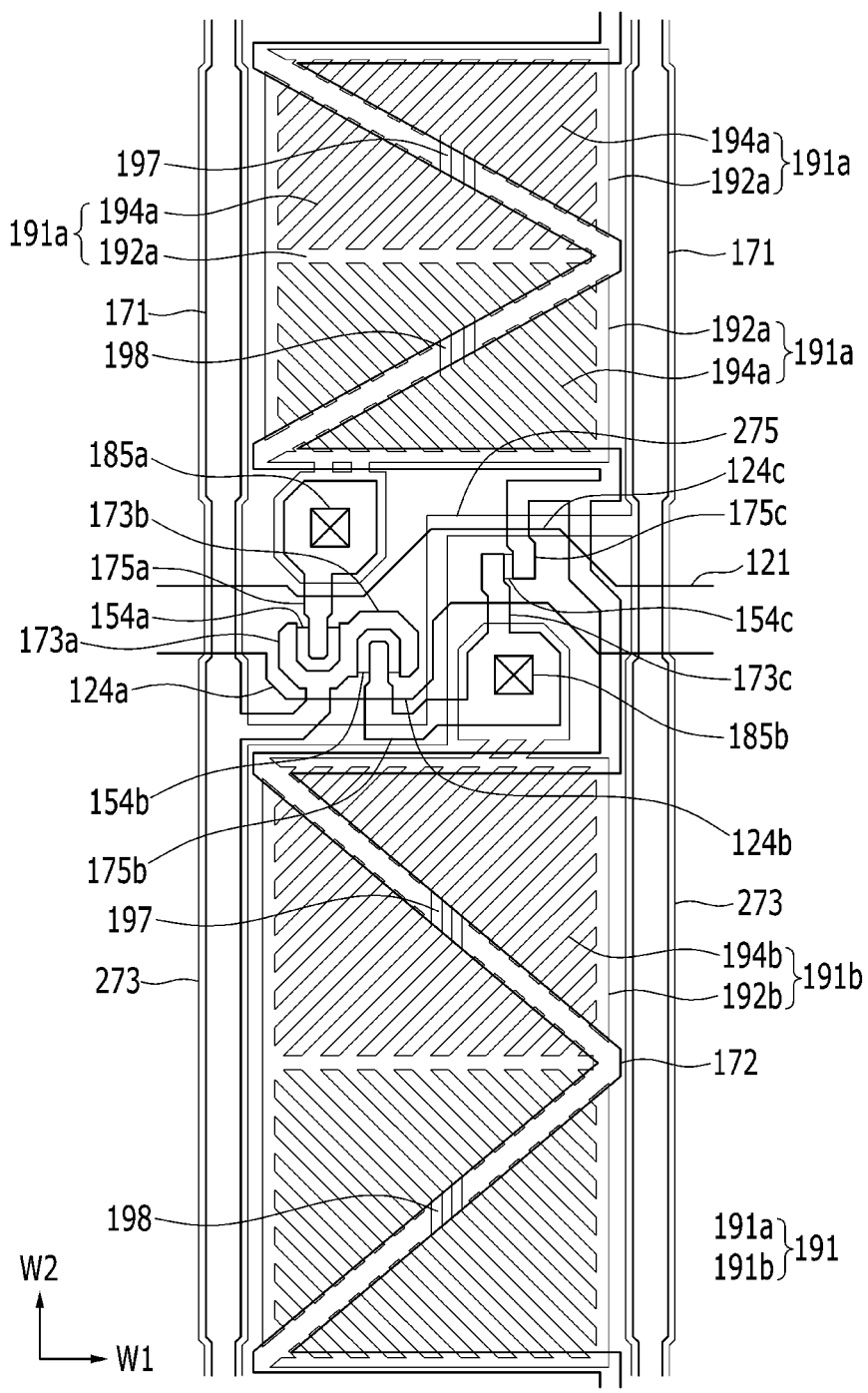
FIG. 9 shows a top plan view of still another exemplary embodiment of a liquid crystal display according to the invention.

The liquid crystal display according to the invention shown in FIG. 9 substantially corresponds to the liquid crystal display according to the invention shown in FIG. 8, thus no duplicate descriptions will be provided. In the exemplary embodiment of the liquid crystal display in FIG. 9, a formation position of the stem of the pixel electrode is different from the previous exemplary embodiment, which will now be described.

FIG. 9 shows a top plan view of still another exemplary embodiment of a liquid crystal display according to the invention.

The pixel electrode 191 includes a first sub-pixel electrode 191a and a second sub-pixel electrode 191b. The first sub-pixel electrode 191a is disposed in the first subpixel PXa, and the second sub-pixel electrode 191b is disposed in the second subpixel PXb.

An overall shape of the first sub-pixel electrode 191a and the second sub-pixel electrode 191b are quadrangles. The first sub-pixel electrode 191a and the second sub-pixel electrode 191b respectively include stems 192a and 192b, and fine branches 194a and 194b extending from the stems 192a and 192b. The stems 192a and 192b are provided at edges of the subpixels PXa and PXb and at borders between the second domains Da2 and Db2 and the third domains Da3 and Db3. Horizontal and vertical portions of the stems 192a and 192b are provided at the edges of the subpixels PXa and PXb. Horizontal stems 192a and 192b are provided at the borders between the second domains Da2 and Db2 and the third domains Da3 and Db3.

The liquid crystal display further includes a first connection branch 197 which connects the fine branches 194a and 194b provided in the first domains Da1 and Db1 and the fine branches 194a and 194b provided in the second domains Da2 and Db2 to each other. The liquid crystal display further includes a second connection branch 198 which connects the fine branches 194a and 194b provided in the third domains Da3 and Db3 and the fine branch 194a and 194b provided in the fourth domains Da4 and Db4 to each other. The collection of the stems, fine branches and connection branches within a pixel electrode (or sub-pixel electrode) form a unitary pixel electrode member.

The first connection branch 197 is provided at a center of a border line between the first domains Da1 and Db1 and the second domains Da2 and Db2, and the second connection branch 198 is provided at a center of a border line between the third domains Da3 and Db3 and the fourth domains Da4 and Db4. The first connection branch 197 and the second connection branch 198 may be parallel with first-side (e.g., outer) edges of the subpixels PXa and PXb. In an exemplary embodiment, for example, the first connection branch 197 and the second connection branch 198 may be elongated to have a length parallel with the data line 171. The invention is not limited thereto, however, and the first connection branch 197 and the second connection branch 198 may be elongated parallel with the gate line 121.

The reference voltage line 172 shown in FIG. 9 is shown to be provided at the border between the first domains Da1 and Db1 and the second domains Da2 and Db2 and at the border between the third domains Da3 and Db3 and the fourth domains Da4 and Db4, as in FIG. 8. The invention is not limited thereto, however, and the reference voltage line 172 may be provided at edges of the subpixels PXa and PXb and at borders between the second domains Da2 and Db2 and the third domains Da3 and Db3, as in FIG. 3.

A liquid crystal display according to yet another exemplary embodiment of the invention will now be described with reference to FIG. 10.

Figure 10:
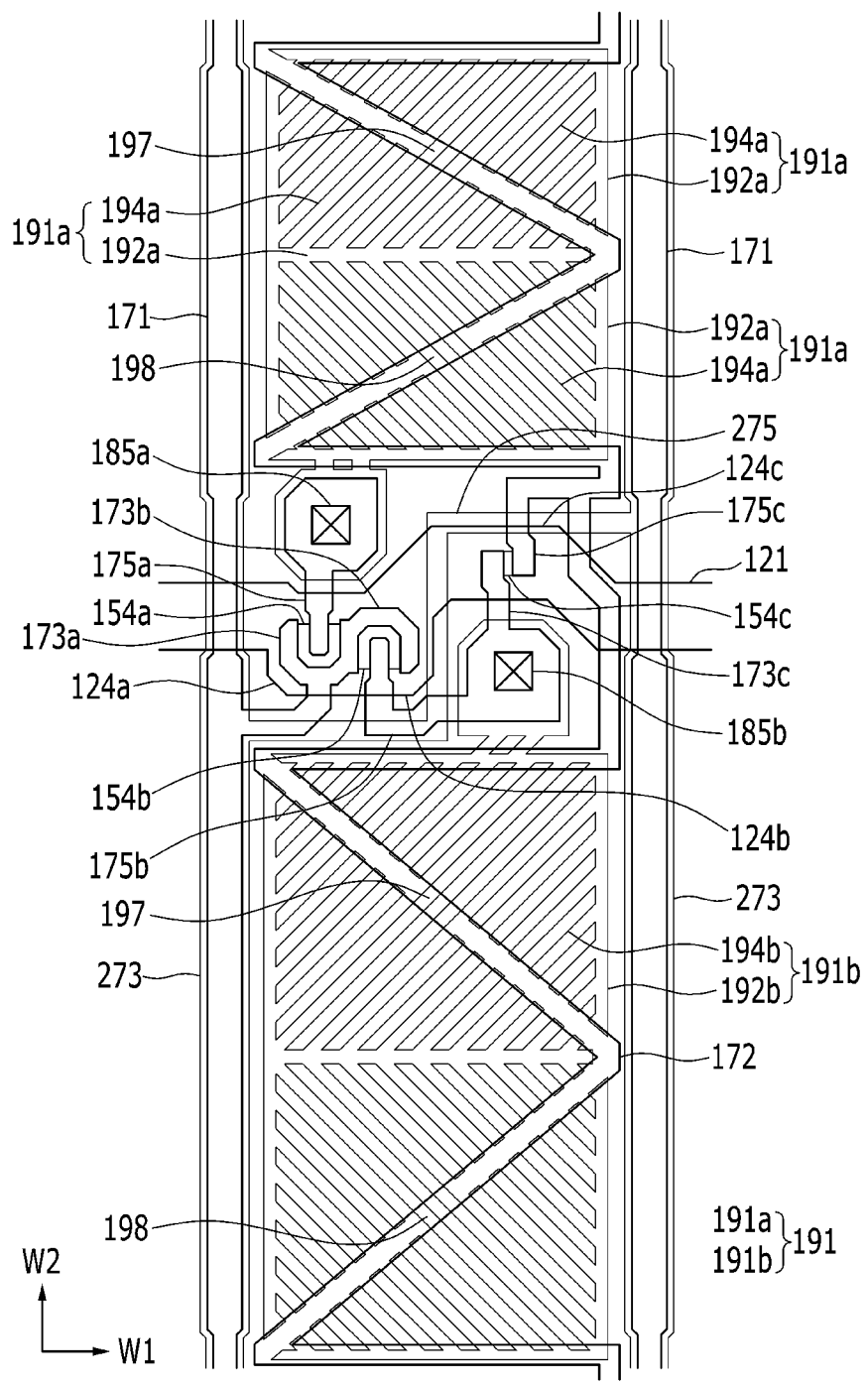
FIG. 10 shows a top plan view of yet another exemplary embodiment of a liquid crystal display according to the invention.

The liquid crystal display according to the invention shown in FIG. 10 substantially corresponds to the liquid crystal display according to the invention shown in FIG. 9, thus no duplicate descriptions will be provided. In the exemplary embodiment of the liquid crystal display in FIG. 10, a formation direction of the first connection branch 197 and the second connection branch 198 is different from the previous exemplary embodiments, which will now be described.

FIG. 10 shows a top plan view of yet another exemplary embodiment of a liquid crystal display according to the invention.

The first connection branch 197 at a center of a border line between the first domains Da1 and Db1 and the second domains Da2 and Db2 is parallel with the fine branches 194a and 194b provided in the first domains Da1 and Db1 and the second domains Da2 and Db2. The second connection branch 198 at a center of a border line between the third domains Da3 and Db3 and the fourth domains Da4 and Db4 is parallel with the fine branches 194a and 194b provided in the third domains Da3 and Db3 and the fourth domains Da4 and Db4.

A liquid crystal display according to yet an exemplary embodiment of the invention will now be described with reference to FIG. 11.

Figure 11:
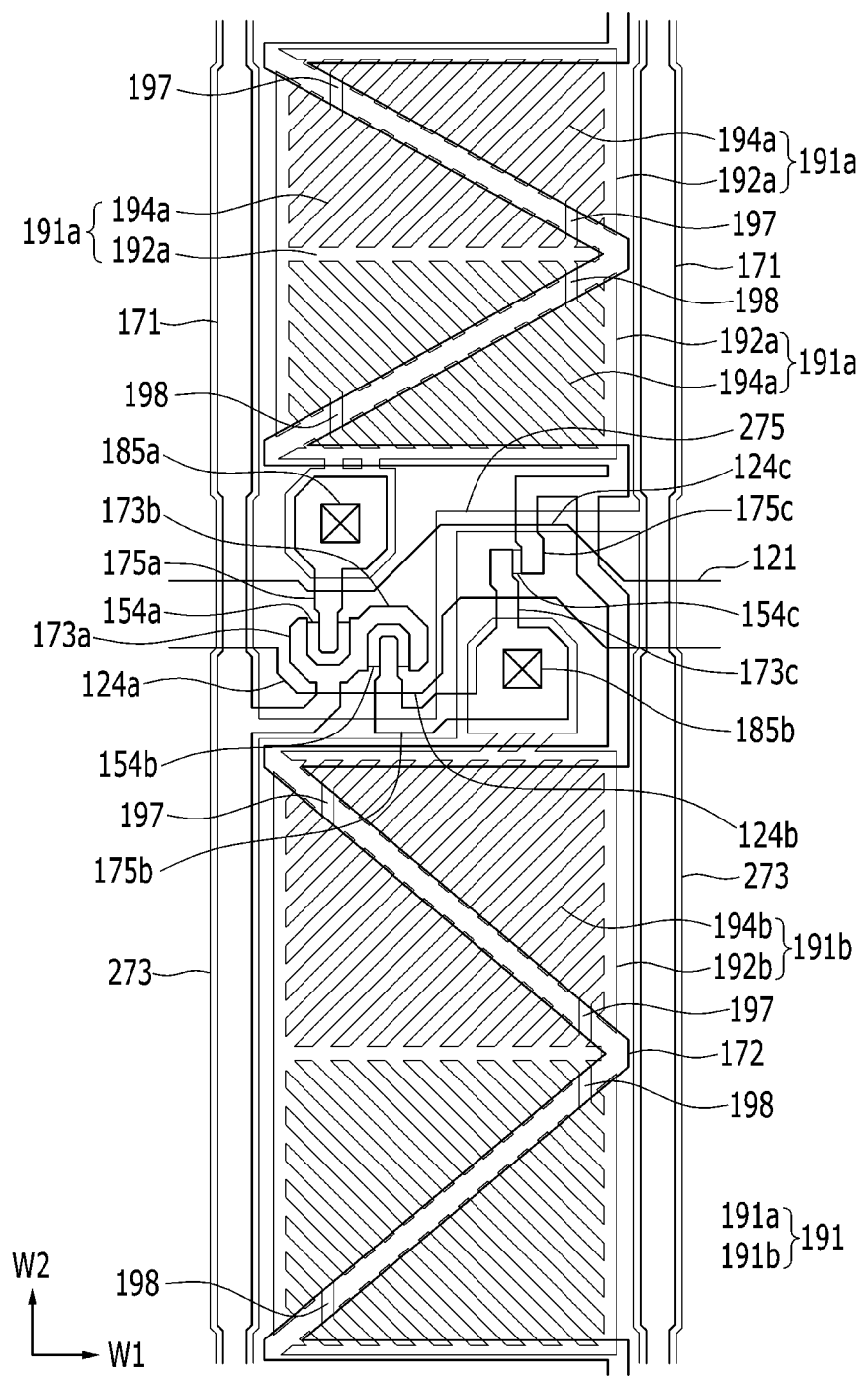
FIG. 11 shows a top plan view of yet another exemplary embodiment of a liquid crystal display according to the invention.

The liquid crystal display according to the invention shown in FIG. 11 substantially corresponds to the liquid crystal display according to the invention shown in FIG. 10, thus no duplicate descriptions will be provided. In the exemplary embodiment of the liquid crystal display in FIG. 11, a formation position of the first connection branch 197 and the second connection branch 198 is different from the previous exemplary embodiments, which will now be described.

FIG. 11 shows a top plan view of yet another exemplary embodiment of a liquid crystal display according to the invention.

The first connection branch 197 is provided at an edge of the pixel at a border line between the first domains Da1 and Db1 and the second domains Da2 and Db2, and the second connection branch 198 is provided at an edge of the pixel at a border line between the third domains Da3 and Db3 and the fourth domains Da4 and Db4. It is shown in FIG. 11 that portions of the first connection branch 197 are provided on respective opposing side edges of the pixel at a border line between the first domains Da1 and Db1 and the second domains Da2 and Db2, and portions of the second connection branch 198 are provided on respective opposing side edges of the pixel at a border line between the third domains Da3 and Db3 and the fourth domains Da4 and Db4. The invention is not limited thereto, however, and portions of the first connection branch 197 may both be provided at a first-side edge of the pixel at a border line between the first domains Da1 and Db1 and the second domains Da2 and Db2, and portions of the second connection branch 198 may both be provided at a first-side edge of the pixel at a border line between the third domains Da3 and Db3 and the fourth domains Da4 and Db4.

The first connection branch 197 and the second connection branch 198 shown in FIG. 11 are elongated to have a length parallel with the data line 171. The invention is not limited thereto, however, and the first connection branch 197 and the second connection branch 198 may be elongated to have a length parallel with the gate line 121. In another exemplary embodiment, the first connection branch 197 may be elongated to have a length parallel with the fine branches 194a and 194b provided in the first domains Da1 and Db1 and the second domains Da2 and Db2, and the second connection branch 198 may be elongated to have a length parallel with the fine branches 194a and 194b provided in the third domains Da3 and Db3 and the fourth domains Da4 and Db4.

While this invention has been described in connection with what is presently considered to be practical exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A liquid crystal display comprising:
   a first substrate including a pixel;
   a pixel electrode in the pixel of the first substrate;
   a second substrate facing the first substrate;
   a common electrode on the second substrate; and
   a liquid crystal layer between the first substrate and the second substrate,
   wherein
   the pixel includes a first domain, a second domain, a third domain and a fourth domain,
   the pixel electrode in the pixel including the first to fourth domains includes a stem from which a fine branch extends, and
   within the pixel including the first to fourth domains:
      a planar shape of each of the first domain, the second domain, the third domain and the fourth domain is a right triangle,
      among sides of the right triangle:
         an oblique side of the first domain is adjacent to an oblique side of the second domain, and
         an oblique side of the third domain is adjacent to an oblique side of the fourth domain,
      a first portion of the stem of the pixel electrode extends along a border line between the first domain and the second domain,
      a second portion of the stem of the pixel electrode extends along a border line between the third domain and the fourth domain,
      the fine branch in the first domain and the fine branch in the second domain respectively extend from opposing sides of the first portion of the stem extended along the border line between the first domain and the second domain, and
      the fine branch in the third domain and the fine branch in the fourth domain respectively extend from opposing sides of the second portion of the stem extended along the border line between the third domain and the fourth domain.

2. The liquid crystal display of claim 1, wherein within the pixel including the first to fourth domains,
   a length of the fine branch in the first domain is parallel with a length of the fine branch in the second domain, and
   a length of the fine branch in the third domain is parallel with a length of the fine branch in the fourth domain.

3. The liquid crystal display of claim 2, wherein within the pixel including the first to fourth domains,
   the fine branches in the first domain and the second domain are symmetrical with the fine branches in the third domain and the fourth domain with respect to a border line between the second domain and the third domain as an axis of symmetry.

4. The liquid crystal display of claim 3, further comprising a reference voltage line on the first substrate,
   wherein the reference voltage line is at an edge of the pixel including the first to fourth domains.

5. The liquid crystal display of claim 4, wherein within the pixel including the first to fourth domains,
   the reference voltage line extends along the border line between the second domain and the third domain.

6. The liquid crystal display of claim 4, wherein within the pixel including the first to fourth domains,
   a first portion of the reference voltage line extends along the border line between the first domain and the second domain, and
   a second portion of the reference voltage line extends along the border line between the third domain and the fourth domain.

7. The liquid crystal display of claim 3, wherein within the pixel including the first to fourth domains,
   the first portion of the stem of the pixel electrode extends along an edge of the pixel, and
   the second portion of the stem of the pixel electrode extends along the border line between the second domain and the third domain.

8. The liquid crystal display of claim 7, wherein within the pixel including the first to fourth domains, the pixel electrode further comprises:
   a first connection branch extended between the first and second domains, the first connection branch connecting the fine branch in the first domain and the fine branch in the second domain to each other; and
   a second connection branch extended between the third and fourth domains, the second connection branch connecting the fine branch in the third domain and the fine branch in the fourth domain to each other.

9. The liquid crystal display of claim 8, wherein within the pixel including the first to fourth domains,
   the first connection branch is at a center of the border line between the first domain and the second domain, and
   the second connection branch is at a center of the border line between the third domain and the fourth domain.

10. The liquid crystal display of claim 9, wherein within the pixel including the first to fourth domains,
    lengths of the first connection branch and the second connection branch are parallel with an outer edge of the pixel.

11. The liquid crystal display of claim 9, wherein within the pixel including the first to fourth domains,
    a length of the first connection branch is parallel with the fine branch in the first domain and the second domain, and
    a length of the second connection branch is parallel with the fine branch in the third domain and the fourth domain.

12. The liquid crystal display of claim 8, wherein within the pixel including the first to fourth domains,
 the first connection branch is at an end the border line between the first domain and the second domain, and
 the second connection branch is at an end of the border line between the third domain and the fourth domain.

13. The liquid crystal display of claim 1, wherein
 an overall shape of the pixel including the first to fourth domains is a quadrangle, and
 within the quadrangle-shaped pixel including the first to fourth domains a length of a border line between the second domain and the third domain is parallel with an outer edge of the pixel.

14. The liquid crystal display of claim 1, further comprising
 a gate line and a data line on the first substrate and crossing each other,
 wherein within the pixel including the first to fourth domains, a length of a border line between the second domain and the third domain is parallel with the gate line.

15. The liquid crystal display of claim 1, wherein
 the liquid crystal display is curved in a first direction, and
 within the pixel including the first to fourth domains, a length of a border line between the second domain and the third domain is parallel with the first direction in which the liquid crystal display is curved.

16. The liquid crystal display of claim 1, wherein
 the pixel including the first to fourth domains further includes a first subpixel and a second subpixel, and
 each of the first subpixel and the second subpixel includes the first domain, the second domain, the third domain and the fourth domain.

17. The liquid crystal display of claim 16, wherein within the pixel including the first subpixel and the second sub-pixel,
 the pixel electrode includes a first sub-pixel electrode in the first subpixel and a second sub-pixel electrode in the second subpixel.

* * * * *